United States Patent
Ho

(10) Patent No.: US 12,034,354 B2
(45) Date of Patent: Jul. 9, 2024

(54) SPRING RETENTION SYSTEM FOR DC MOTOR

(71) Applicant: Vitesco Technologies USA, LLC, Auburn Hills, MI (US)

(72) Inventor: Wai-Tak Ho, Palatine, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 980 days.

(21) Appl. No.: 16/598,857

(22) Filed: Oct. 10, 2019

(65) Prior Publication Data

US 2020/0220424 A1 Jul. 9, 2020

Related U.S. Application Data

(60) Provisional application No. 62/847,584, filed on May 14, 2019, provisional application No. 62/788,526, filed on Jan. 4, 2019.

(51) Int. Cl.
*H02K 5/24* (2006.01)
*F16F 1/18* (2006.01)
*F16F 15/073* (2006.01)

(52) U.S. Cl.
CPC ............... *H02K 5/24* (2013.01); *F16F 1/18* (2013.01); *F16F 15/073* (2013.01)

(58) Field of Classification Search
CPC ............. H02K 5/24; F16F 1/18; F16F 15/073
See application file for complete search history.

(56) References Cited

U.S. PATENT DOCUMENTS

| 5,786,647 A | * | 7/1998 | Vollmer | F04D 25/08 |
| | | | | 310/91 |
| 9,979,257 B2 | * | 5/2018 | Wittstadt | H02K 5/15 |
| 2002/0171059 A1 | * | 11/2002 | Sakurai | F16K 31/043 |
| | | | | 251/305 |

FOREIGN PATENT DOCUMENTS

| DE | 4342949 A1 | 6/1995 |
| DE | 9418283 U1 | 3/1996 |
| EP | 1544438 A2 | 6/2005 |
| EP | 3402054 A1 | 11/2018 |

* cited by examiner

*Primary Examiner* — Vishal R Sahni

(57) ABSTRACT

A spring retention system for securing a motor in a desired position. The spring retention system includes a captive feature, which includes a plurality of recesses formed as a motor support spring having a circular opening, which are engaged with a motor bearing housing. The spring retention system reduces motor displacement in multiple directions when the motor is exposed to vibrations, which reduces the cantilever bending on the motor shaft and the motor housing, also improving motor pinion run out. The spring retention system also includes a formed opening feature, which allows for the spring retention system to fit with motor bearings having different sizes. The spring retention system also includes a plurality of spring leg retention features formed as part of the motor support spring, which support the motor bearing housing on an axis, and the module housing supports the motor support spring.

11 Claims, 3 Drawing Sheets

SPRING RETENTION SYSTEM FOR DC MOTOR

CROSS-REFERENCE TO RELATED APPLICATIONS

This application claims the benefit of provisional application 62/778,526, filed Dec. 12, 2018, and provisional application 62/847,584, filed May 14, 2019. The disclosures of the above applications are incorporated herein by reference.

FIELD OF THE INVENTION

The invention relates generally to a spring retention system for a DC motor, where the spring retention system reduces displacement of the DC motor when vibrations occur, and improves alignment of the DC motor.

BACKGROUND OF THE INVENTION

DC motors are commonly used for various applications, and typically include a shaft which is rotated by various electrical components located inside a housing. The shaft partially extends into the housing, and a pinion gear or the like is mounted to an end of the shaft which extends out of the housing. The pinion gear may be in mesh with another gear, a rack, or some other component.

One type of application a DC motor may be used for is an actuator for a device such as a transmission controller. The DC motor used in this type of application may be subject to vibration, which may affect the operation of the DC motor, and may cause a premature wear of various parts of the DC motor.

Accordingly, there exists a need for a reduction in the amount of vibration a DC motor is exposed to during operation, reducing premature wear, and prolonging the service life of the DC motor.

SUMMARY OF THE INVENTION

In one embodiment, the present invention is a spring retention system for a DC motor which reduces displacement when the motor is exposed to vibration and improves alignment of the motor and the pinion gear, extending the life of the motor.

In some examples, the system is a mechanical spring retention system which is provided for a module with a DC motor where the DC motor is used for an application on a vehicle. In an embodiment, the spring retention system includes a spring leg retention feature, a captive feature, and a formed opening feature. The spring leg retention feature includes a plurality of retention legs that deflect outward when the spring retention system is installed between the housing of the DC motor and a module housing. The captive feature includes a plurality of recess deflects that are offset for engaging an adjacent motor bearing or bushing housing when the motor bearing or bushing housing is connected to the spring retention system. The formed opening feature includes an open channel that is able to expand such that the spring retention system is able to fit different sizes of motor bearing or bushing surface housing.

In an embodiment, the present invention is a spring retention system for securing a motor, such as a DC motor, in a desired position. The spring retention system includes a module housing forming a circular opening and a circular plurality of recesses. A motor bearing housing is centrally located by the spring retention system between a module housing and motor bearing.

In an embodiment, the spring retention system includes a captive feature, where the captive feature includes a plurality of recesses formed as a motor support spring, which are engaged with a motor bearing housing. The spring retention system occupies the space between a module housing and motor bearing housing and reduces motor displacement in multiple directions.

The plurality of recesses allows for the motor support spring to deflect outward when assembled with the motor bearing housing for a more secure connection. Because the motor support spring occupies the space between the motor bearing housing and module housing, cantilever bending on the motor shaft and housing is reduced, also improving motor pinion run out or alignment.

In an embodiment, the spring retention system also includes a formed opening feature. The formed opening feature allows for the spring retention system to fit with motor bearings having different sizes. The motor support spring has a circular structural body with an opening which allows for attachment to different size bearing housings by adjusting the gap of the opening.

In an embodiment, the spring retention system also includes a plurality of spring leg retention features formed as part of the motor support spring. The spring leg retention features support the motor bearing housing on an axis, and the module housing supports the motor support spring. The motor spring and the spring leg retention features occupy the space between module housing and motor bearing housing.

The spring retention system according to the present invention allows for reduction in vibration of the DC motor, provides for reduced packing, and is suitable for use with motors of different sizes.

In an embodiment, the present invention is a spring retention system having a motor support spring. The motor support spring includes a wall portion having a first end and a second end, at least one captive feature integrally formed as part of the wall portion, and at least one spring leg retention feature integrally formed with the at least one captive feature. The at least one captive feature applies force to a portion of a DC motor, and the at least one spring leg retention feature applies force to another portion of the DC motor, preventing displacement of the DC motor when the DC motor is exposed to one or more vibrations.

In an embodiment, the motor support spring is operable for connection with one or more of a plurality of DC motors such that the wall portion deflects and the distance between the first end of the wall portion and the second end of the wall portion changes, depending upon which of the plurality of DC motors the motor support spring is connected to, and the outer diameter of the one of the plurality of DC motors the motor support spring is connected to.

In an embodiment, a plurality of captive features is integrally formed as part of the wall portion, and a plurality recesses are integrally formed as part of the wall portion. Each one of the recesses is located between two of the captive features.

In an embodiment, the motor support spring includes a plurality of spring leg retention features, which prevent displacement of the DC motor when the DC motor is exposed to vibration along one or more axes.

In an embodiment, a plurality of wall sections are formed as part of the wall portion, and each of the spring leg retention features is integrally formed with a corresponding one of the wall sections.

In one embodiment, the DC motor includes a cap portion connected to a housing, a sidewall formed as part of the cap portion, and a flange portion integrally formed as part of the side wall. The captive feature applies force to the sidewall and the spring leg retention feature applies force to the flange portion when the motor support spring is connected to the DC motor.

The motor support spring prevents the movement of the DC motor when the DC motor is exposed to one or more cantilever vibrations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
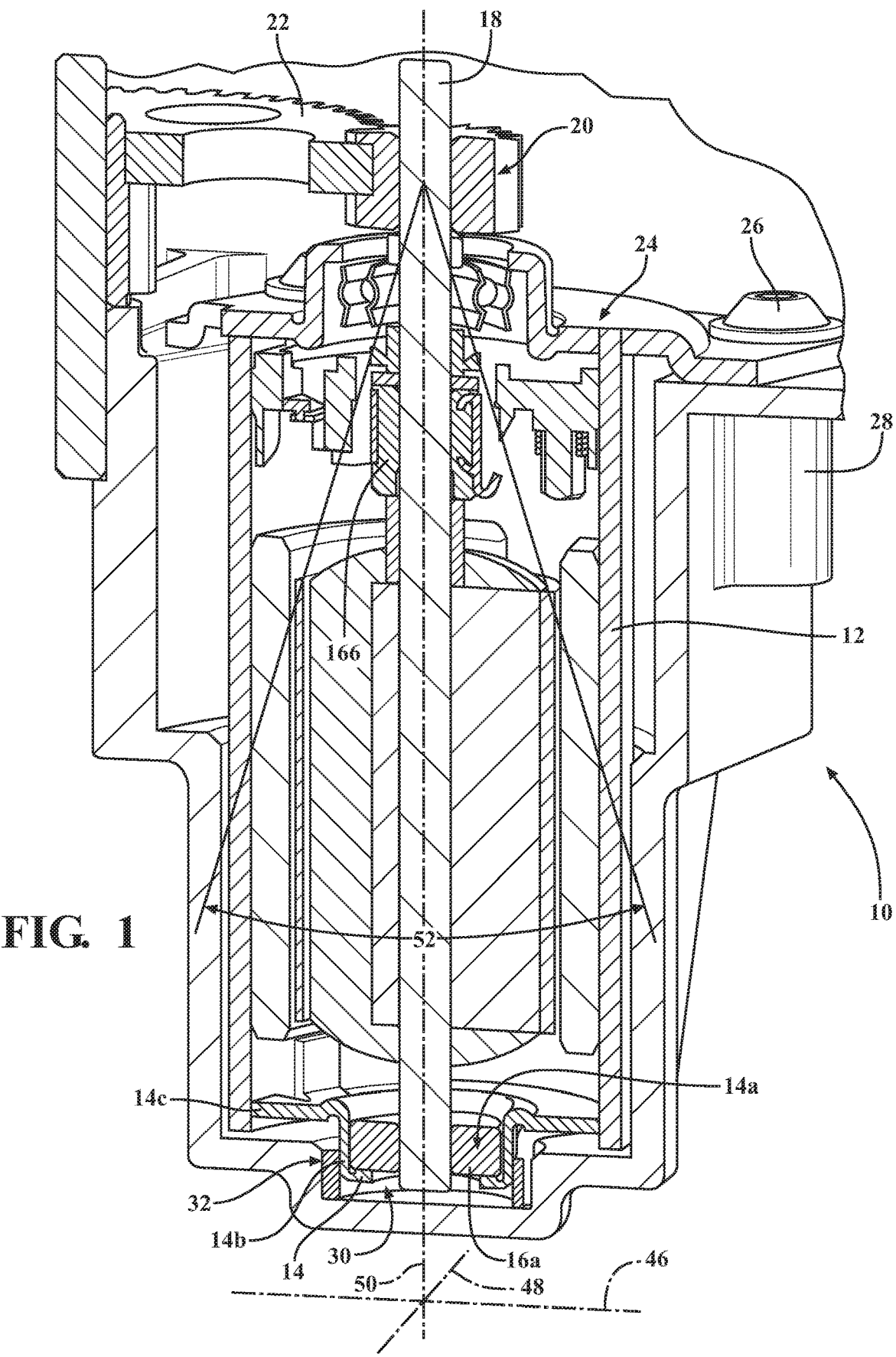
FIG. 1 is a sectional side view of a DC motor having a spring retention system, according to embodiments of the present invention.
Figure 2:
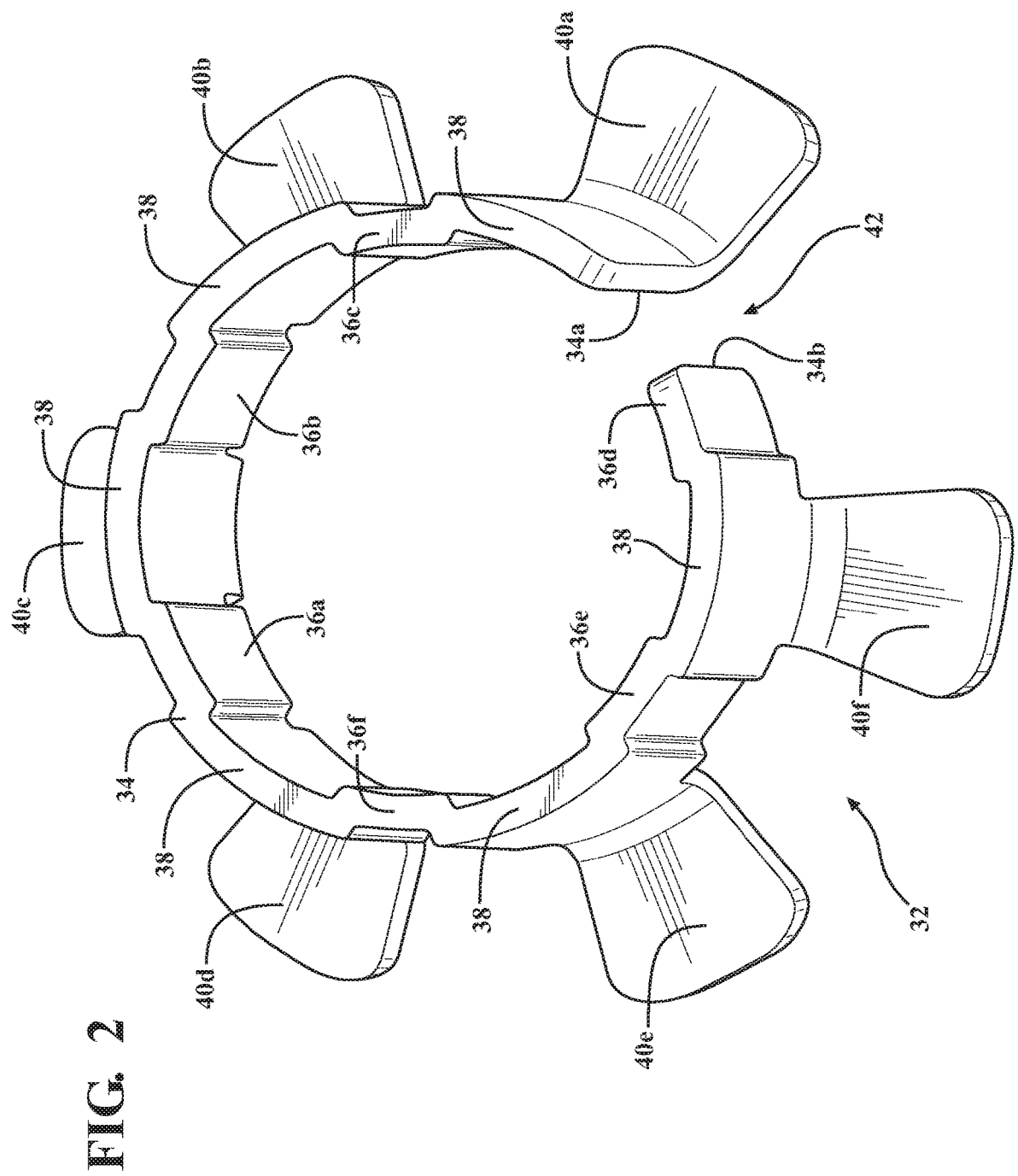
FIG. 2 is a perspective view of a motor support spring used as part of a spring retention system for a DC motor, according to embodiments of the present invention.

The following description of the preferred embodiment(s) is merely exemplary in nature and is in no way intended to limit the invention, its application, or uses.

A sectional view of a DC motor incorporating a spring retention system according to the present invention is shown generally at 10. The DC motor 10 includes a housing 12 having a cap portion 14, where the cap portion 14 includes a recess, shown generally at 14a, where the recess 14a includes a sidewall 14b, and the cap portion 14 also includes a flange portion 14c integrally formed with the sidewall 14b. Disposed within the recess 14a is a first bearing 16a, such that the cap portion 14 functions as a bearing housing. Extending into to the first bearing 16a is a portion of a shaft 18. The shaft 18 also extends through a second bearing 16b, and out of the housing 12. Mounted on the end of the shaft 18 is a pinion gear 20, which is in mesh with another gear 22. There are other components located in the housing 12 which are used to rotate the shaft 18.

Attached to the housing 12 is a front plate 24, and there are several fasteners 26 which are used to attach the front plate 24, and therefore the DC motor 10, to a main housing 28. The main housing 28 also includes a recess 30, and the spring retention system includes a motor support spring, shown generally at 32, where a portion of a motor support spring 32 is disposed in the recess 30.

The motor support spring 32 includes a wall portion 34, and integrally formed with the wall portion 34 is a plurality of captive features 36a-36f, which are equally spaced from one another. Located in between each of the captive features 36a-36f is a plurality of wall sections 38, such that the wall sections 38 and the captive features 36a-36f are integrally formed as part of the wall portion 34 in alternating fashion. Integrally formed with each of the wall sections 38 is a corresponding spring leg retention feature 40a-40f. Because each of the spring leg retention features 40a,40b,40c,40d,40f is integrally formed with a corresponding wall section 38, the spring leg retention features 40a,40b,40c,40d,40f are integrally formed with the wall portion 34 in alternating fashion relative to the captive features 36a-36f.

Figure 3:
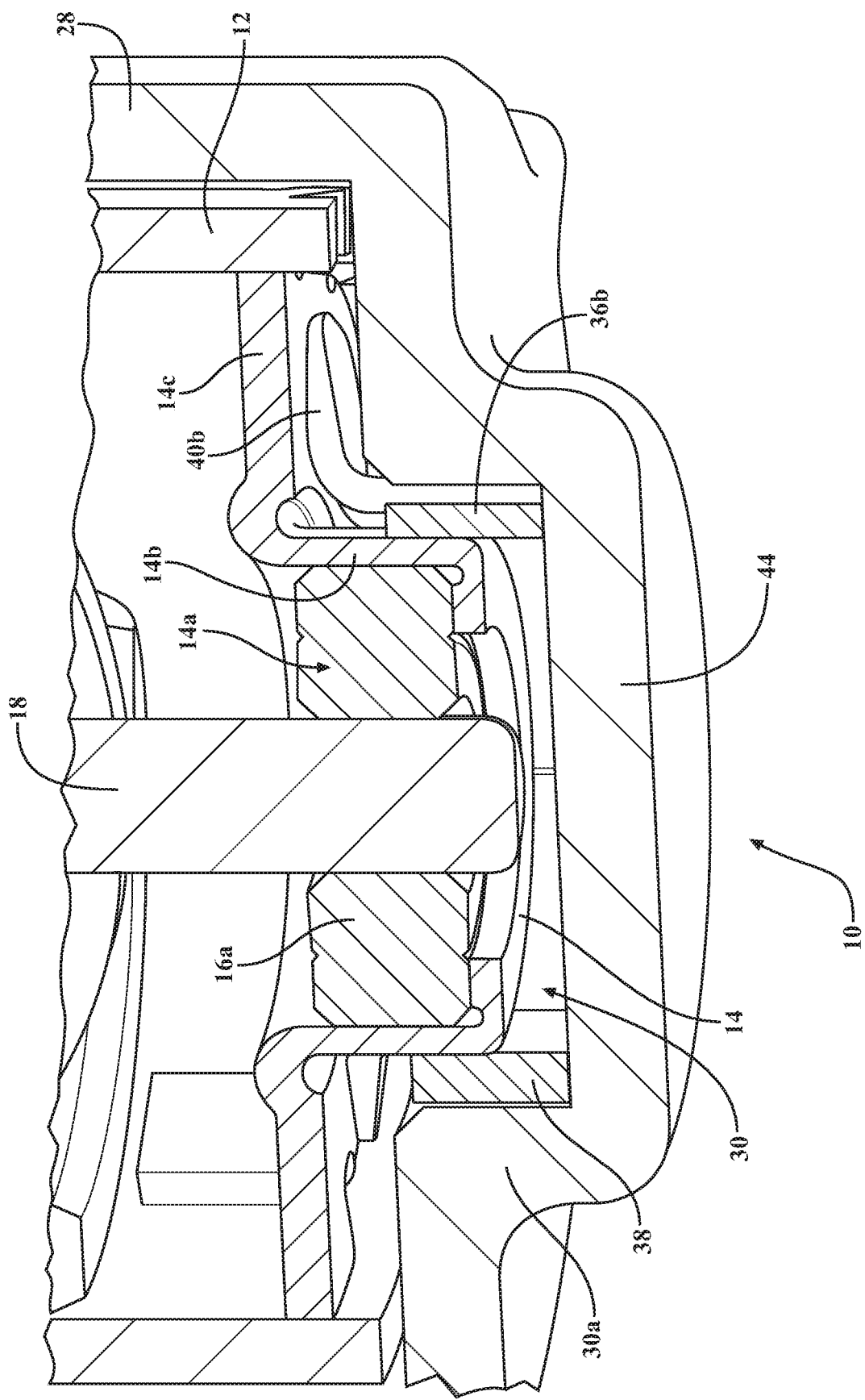
FIG. 3 is sectional side vie of a portion of a DC motor having a spring retention system, according to embodiments of the present invention.

Referring to FIG. 3, the cap portion 14 is substantially circumscribed by the motor support spring 32 such that the captive features 36a-36f are in contact with, and apply force to, the side wall 14b of the cap portion 14. The motor support spring 32 does not completely circumscribe the cap portion 14, there is a gap portion, shown generally at 42, between a first end 34a of the wall portion 34 and a second end 34b of the wall portion 34. The wall portion 34 is able to deflect, such that the size of the gap portion 42 changes as the wall portion 34 deflects. The diameter of the wall portion 34 is smaller than the diameter of the side wall 14b. More specifically, the circular inner diameter formed by the captive features 36a-36f is less than the outer diameter of the side wall 14b. Therefore, when the motor support spring 32 is assembled to the cap portion 14, the wall portion 34 deflects, and the captive features 36a-36f are in contact with, and apply force to, the side wall 14b, providing an interference fit between the cap portion 14 and the motor support spring 32. The connection of the motor support spring 32 to the side wall 14b of the cap portion 14 also causes the gap portion 42 to increase in size as well (i.e., the distance between the first end 34a and the second end 34b of the wall portion 34 increases).

The wall portion 34 is located in the recess 30 of the main housing 28, such that the wall portion 34 is in contact with an outer wall 44 of the recess 30. Areas of the wall portion 34 are also in contact with the sidewall 30a of the recess 30. The inner diameter of the sidewall 30a is larger than the outer diameter of the wall portion 34, such that there is a clearance between the wall portion 34 and the sidewall 30a. More specifically, there is a clearance between the wall sections 38 and the sidewall 30a. The clearance between the wall sections 38 and the sidewall 30a facilitates assembly of the wall portion 34 into the recess 30. The size of the clearance may vary depending upon the tolerance desired and the specifications used during manufacturing.

As mentioned above, there are several spring leg retention features 40a-40f integrally formed with the wall sections 38. When the motor support spring 32 is assembled to the cap portion 14, each of the spring leg retention features 40a-40f deflects and applies force to the flange portion 14c of the cap portion 14. When the DC motor 10 is subjected to vibrations during operation, the vibrations may occur in a direction a long a first axis, or X-axis 46, a direction along a second axis, or Y-axis 48, in a direction along a third axis, or Z-axis 50, or a combination of the axes 46,48,50. The captive features 36a-36f and the spring leg retention features 40a-40f limit or prevent the movement of the DC motor 10 as a result of exposure to vibrations, preventing premature wear of various parts of the DC motor 10, such as the bearings 16a,16b.

Additionally, there may also be movement of the DC motor 10 as a result of the pinion gear 20 being mounted to the shaft 18 incorrectly. Furthermore, vibration may also be induced as a result of the shaft 18 having poor run out properties. The type of vibration that may be induced in this situation is a cantilever vibration such that the shaft 18, and other components of the DC motor 10, move about an angle 52 relative to the pivot point, which as shown in FIG. 1 the pivot point is the pinion gear 20, which is located on the opposite end of the DC motor 10 in relation to the motor support spring 32. The captive features 36a-36f and the spring leg retention features 40a-40f also limit or prevent the movement of the DC motor 10 as a result of exposure to cantilever vibrations, preventing premature wear. It should be noted that although the example of the cantilever vibration is represented by the angle 52 in FIG. 1, other types of cantilever vibration may occur at different angles and have pivot points at locations other than the pinion gear 20.

Because the wall portion 34 is able to deflect, the motor support spring 32 is able to be used with motors of different sizes. More specifically, because the wall portion 34 of the motor support spring 32 is able to deflect, the motor support spring 32 is able to connect to cap portions of various sizes, such that the distance between the first end 34a and the second end 34b of the wall portion 34 varies, and therefore the size of the gap portion 42 varies as well, depending upon the size of the cap portion the motor support spring 32 is connected to.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a DC motor having a first portion and a second portion;
   a motor support spring for the DC motor, including:
   a generally circular wall portion having a first end and a second end, the generally circular wall portion generally perpendicular to the second portion of the DC motor;
   a gap between the first end and the second end;
   a plurality of captive features integrally formed as part of the circular wall portion such that at least one of the plurality of captive features is adjacent the second end;
   a plurality wall sections integrally formed as part of the circular wall portion, each of the plurality of wall sections is adjacent one or more of the plurality of captive features, the plurality of captive features and the plurality of wall sections having approximately the same radial thickness, and one of the plurality wall sections is adjacent the first end; and
   a plurality of spring leg retention features, each of the plurality of spring leg retentions features integrally formed with, extend generally perpendicularly from, and are radially aligned with, a corresponding one of the plurality of wall sections;
   wherein the motor support spring is shaped such that the diameter of the motor support spring is less than the outer diameter of the DC motor, the circular wall portion partially circumscribes the first portion of the DC motor such that each of the plurality of captive features applies force to the first portion of the DC motor, and each of the plurality of spring leg retention features applies force to the second portion of the DC motor, preventing displacement of the DC motor when the DC motor is exposed to one or more vibrations.

2. The apparatus of claim 1, wherein the motor support spring is operable for connection with one or more of a plurality of DC motors such that the circular wall portion deflects and the distance between the first end of the circular wall portion and the second end of the circular wall portion changes, depending upon which of the plurality of DC motors the motor support spring is connected to, and the outer diameter of the one of the plurality of DC motors the motor support spring is connected to.

3. The apparatus of claim 1, further comprising:
   a plurality recesses integrally formed as part of the circular wall portion;
   wherein each one of the plurality of recesses is located between two of the plurality of captive features.

4. The apparatus of claim 1, the DC motor further comprising:
   a cap portion connected to a housing;
   a sidewall formed as part of the cap portion; and
   a flange portion integrally formed as part of the side wall, the flange portion being substantially perpendicular to the sidewall;
   wherein each of the plurality of captive features applies force to the sidewall and each of the plurality of spring leg retention features applies force to the flange portion when the motor support spring is connected to the DC motor.

5. The apparatus of claim 1, wherein the motor support spring prevents the movement of the DC motor when the DC motor is exposed to one or more cantilever vibrations.

6. A motor support spring for a DC motor, comprising:
   a circular wall portion having a first end and a second end;
   a gap between the first end and the second end;
   a plurality of captive features integrally formed as part of the circular wall portion such that at least one of the plurality of captive features is adjacent the second end; and
   a plurality wall sections integrally formed as part of the circular wall portion, each of the plurality of wall sections is adjacent one or more of the plurality of captive features, the plurality of captive features and the plurality of wall sections having approximately the same radial thickness, and one of the plurality wall sections is adjacent the first end;
   a plurality of spring leg retention features, each of the plurality of spring leg retentions features integrally formed with, extend generally perpendicularly from, and are radially aligned with, a corresponding one of the plurality of wall sections such that the plurality of spring leg retention features are positioned in alternating fashion relative to the each of the plurality of captive features;
   wherein the motor support spring is shaped such that the diameter of the motor support spring is less than the outer diameter of the DC motor, the circular wall portion partially circumscribes a first portion of the DC motor such that each of the plurality of captive features applies force to the first portion of the DC motor, and each of the plurality of spring leg retention features applies force to a second portion of the DC motor, preventing displacement of the DC motor when the DC motor is exposed to one or more vibrations, the generally circular wall portion generally perpendicular to the second portion of the DC motor.

7. The motor support spring for a DC motor of claim 6, wherein the motor support spring is operable for connection with the DC motor such that during assembly the circular wall portion deflects and the distance between the first end of the circular wall portion and the second end of the circular wall portion changes, and the plurality of captive features are in contact with, and apply force to, the DC motor, providing an interference fit between the plurality of captive features and the DC motor.

8. The motor support spring for a DC motor of claim 6, further comprising:
   a plurality recesses integrally formed as part of the circular wall portion;
   wherein each one of the plurality of recesses is located between two of the plurality of captive features.

9. The motor support spring for a DC motor of claim 6, wherein the plurality of spring leg retention features prevent the displacement of the DC motor when the DC motor is exposed to vibration along one or more axes.

10. The motor support spring for a DC motor of claim 6, the DC motor further comprising:
   a cap portion connected to a housing;
   a sidewall formed as part of the cap portion; and
   a flange portion integrally formed as part of the side wall, the flange portion being substantially perpendicular to the sidewall;
   wherein each of the plurality of captive features applies force to the sidewall and each of the plurality of spring leg retention features applies force to the flange portion when the motor support spring is connected to the DC motor.

11. The motor support spring for a DC motor of claim 6, wherein the motor support spring prevents the movement of the DC motor when the DC motor is exposed to one or more cantilever vibrations.

\* \* \* \* \*